(No Model.)
J. T. MACDONALD, Jr.
BRAKE MECHANISM.
No. 523,362. Patented July 24, 1894.
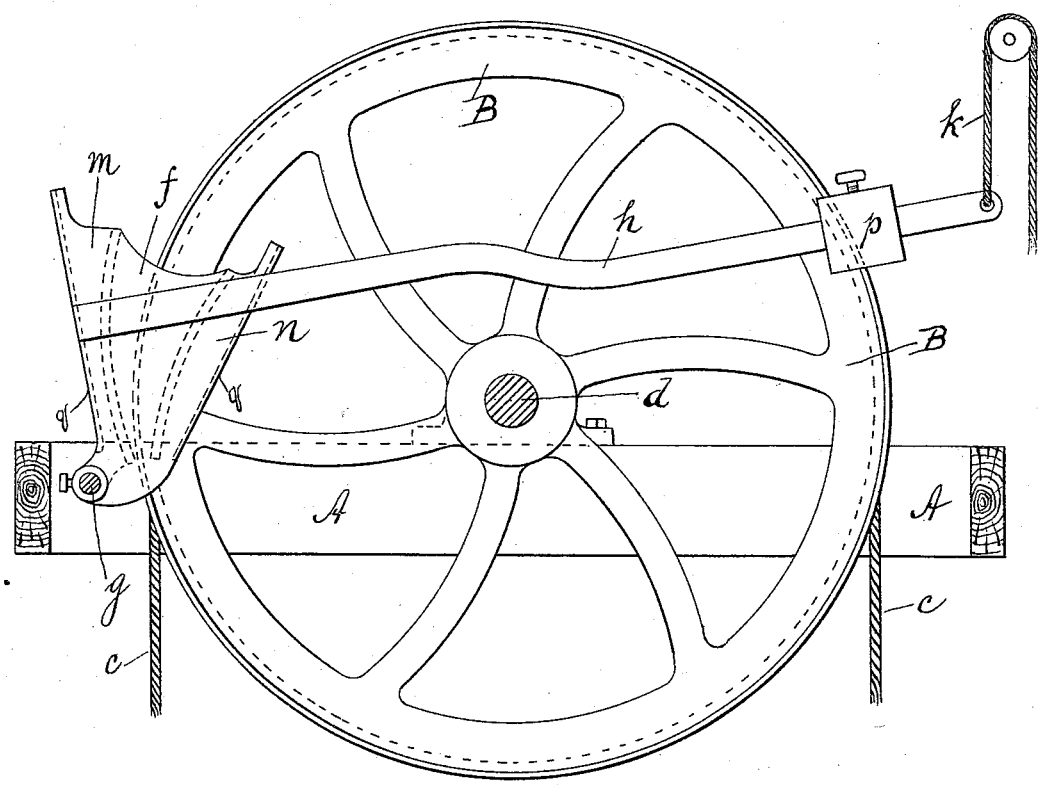
FIG. 1.
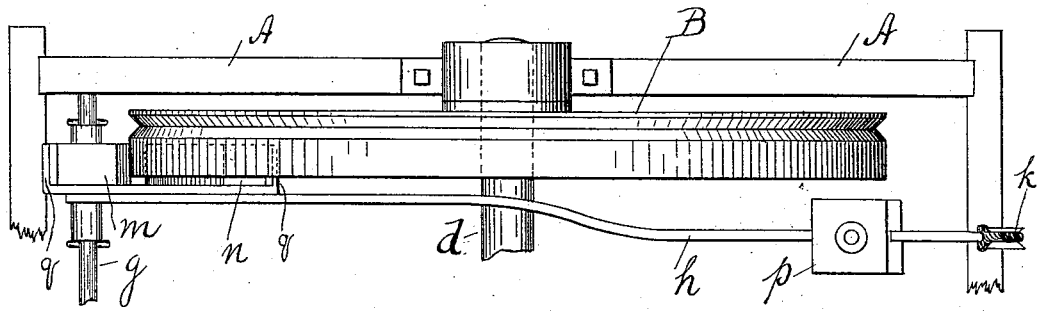
WITNESSES: FIG. 2. INVENTOR:
Robert Wallace.
Alice H. Morison.
John T. Macdonald, Jr.
by Macleod Calver & Randall,
his Attorneys.

UNITED STATES PATENT OFFICE.

JOHN T. MACDONALD, JR., OF BOSTON, MASSACHUSETTS.

BRAKE MECHANISM.

SPECIFICATION forming part of Letters Patent No. 523,362, dated July 24, 1894.

Application filed August 16, 1893. Serial No. 483,259. (No model.)

*To all whom it may concern:*

Be it known that I, JOHN T. MACDONALD, Jr., a subject of the Queen of Great Britain, residing at Boston, in the county of Suffolk and State of Massachusetts, have invented certain new and useful Improvements in Brake Mechanism for Hoisting Apparatus, of which the following is a specification, reference being had therein to the accompanying drawings.

My invention has for its object to provide an improved brake mechanism for hoisting apparatus.

In an apparatus such as is employed for raising or lowering goods or the like from one floor of a building to another, and which is operated by hand by means of a rope which passes over a power-wheel forming part of the apparatus, it is desirable to have a very effective brake by means of which the load may be stopped at any point. Such a brake should be so constructed as to reduce the danger in the use of the apparatus to a minimum, and to effect this the brake, in its normal position, should be operative so that the load cannot be raised or lowered without first operating the brake to release it. To still further reduce the danger from accident, it is desirable that the brake mechanism should, when actuated or operated beyond a given point which is necessary to free the brake, be again operative to stop the device. That is to say, the brake mechanism which is ordinarily operated by means of a rope which may be grasped either from the elevator car or from a floor of the building, should be free only when a comparatively slight amount of power is applied to the rope, so that under conditions of excitement, if the rope is not touched by the operator the brake will be on and the apparatus will stop, or if the rope be seized and strong strain applied the brake mechanism will operate and the car will be stopped, so that under any probable action of the operator when excited the car will be stopped. Such brake mechanisms are already in use and are well-known, but so far as known to me, they are more or less complicated and liable to get out of order, and are expensive in construction, and for these reasons are objectionable.

My present invention consists in an improved brake mechanism for hoisting apparatus which is hereinafter more fully set forth and the novel features of which are pointed out in the claims which are appended hereto and made a part hereof, the design of the device being to obviate the objections above set forth.

My device will be readily understood from the following description in which reference is made to the accompanying drawings, in which—

Figure 1 is a side elevation, and Fig. 2 is a plan view of a power wheel of a hoisting apparatus showing my device applied thereto.

A represents the supporting frame upon which the apparatus is mounted.

B is the power-wheel over which the rope $c$, Fig. 1, by means of which the power is applied, passes, said rope $c$ lying preferably in a groove in the periphery of the wheel B. The wheel B is provided with a periphery grooved at one side or portion to receive the rope $c$ and plain at the other side or portion. The plain portion projects somewhat upon one side of the wheel forming both an exterior and an interior brake surface.

The shaft of the power-wheel is shown at $d$, and is mounted in suitable bearings in the supporting frame. The brake mechanism consists of a carrier $f$, preferably of metal, and preferably of the triangular shape shown, and is pivoted at or near one corner on a rod $g$ set in the supporting frame A. The rod $g$ is located outside of the periphery of the power-wheel, and somewhat below the level of the power-wheel shaft $d$, as shown.

A brake lever $h$ which extends horizontally is rigidly secured at one end to the carrier and to its free end is attached a rope $k$ by means of which it may be operated by hand, either from the elevator car or from one of the floors of the building, the said rope $k$ passing up over a pulley fixed to a stationary support inside the elevator well and above the said brake lever, so that when the rope is drawn downwardly the lever will be raised. The carrier $f$ projects past the periphery of the power-wheel and is provided on the face next the said periphery with two brake shoes, $m$, $n$, preferably made of wood of a proper shape to fit the exterior and interior brake surfaces respectively of the said periphery, and covered with leather or similar material on their contact faces.

The carrier $f$ is of a sufficient width, and the brake shoes are set sufficiently apart so that only one of them at a time will bear on the power-wheel, and so that if the brake lever $h$ be raised slightly both of the brake shoes will be freed from the periphery of the power-wheel.

The brake shoe $m$ is in contact with the exterior brake surface of the power wheel when the mechanism is in its normal position, and it is held against said surface not only by the weight of the carrier but also by the weight of the brake lever $h$. In case a very long brake rope $k$ be used, the weight of the rope might counter-balance the weight of the lever $h$ so that the braking effect of the mechanism in its normal position would be very slight. To offset the weight of the rope $k$ a weight, shown at $p$, may be hung on the brake lever $h$ and may be arranged to slide thereon so that the normal braking effect of the mechanism may be increased or diminished as desired. If the brake rope be seized and a downward strain applied the brake lever $h$ will be raised and both brake shoes will be freed from the power-wheel. If the downward strain be continued the interior brake shoe $n$ will be forced into contact with the interior brake surface of the periphery of the power wheel and the wheel will be stopped. After it is stopped if the brake rope be released, the interior brake shoe $n$ will be freed from the power wheel and the exterior brake shoe $m$ will be brought into contact with the wheel, holding the wheel in a fixed position without effort on the part of the operator.

The carrier $f$ is provided with flanges as shown at $q$ which serve as backings for the brake shoes, strengthening the device and permitting the brake shoes to be firmly secured in place.

By my invention a very compact, simple and efficient brake is provided which is durable and not liable to get out of order and which is inexpensive in construction.

What I claim is—

1. In a hoisting apparatus the combination with a power-wheel having internal and external brake surfaces of a movable carrier having secured thereto opposite brake shoes engaging alternately with the brake surfaces of the wheel in the opposite positions of the carrier, and means for moving the said carrier the said carrier normally occupying a position which holds one of the brake shoes in engagement with its co-acting brake surface substantially as set forth.

2. In a hoisting apparatus, the combination with a power-wheel, having internal and external brake surfaces of a brake lever having mounted thereon an exterior and an interior brake shoe engaging alternately said external and internal brake surfaces in the opposite extremes of position of the brake lever, one of said brake shoes remaining normally in engagement with its co-acting brake surface substantially as set forth.

3. In a hoisting apparatus the combination with a power wheel having internal and external brake surfaces of a pivoted carrier and operating lever secured thereto and exterior and interior brake shoes secured to said carrier and alternately engaging said external and internal brake surfaces of the wheel, according as the said carrier is shifted to one or the other of its extremes of position, one of said shoes resting normally in engagement with its co-acting brake surface substantially as set forth.

In testimony whereof I affix my signature in presence of two witnesses.

JOHN T. MACDONALD, JR.

Witnesses:
WM. A. MACLEOD,
ROBERT WALLACE.